CLASSIFICATION
7727-X
DIVISION.
Charles W. Taylor's
Plough. 8-23-1833
Patented 23 Aug 1833.
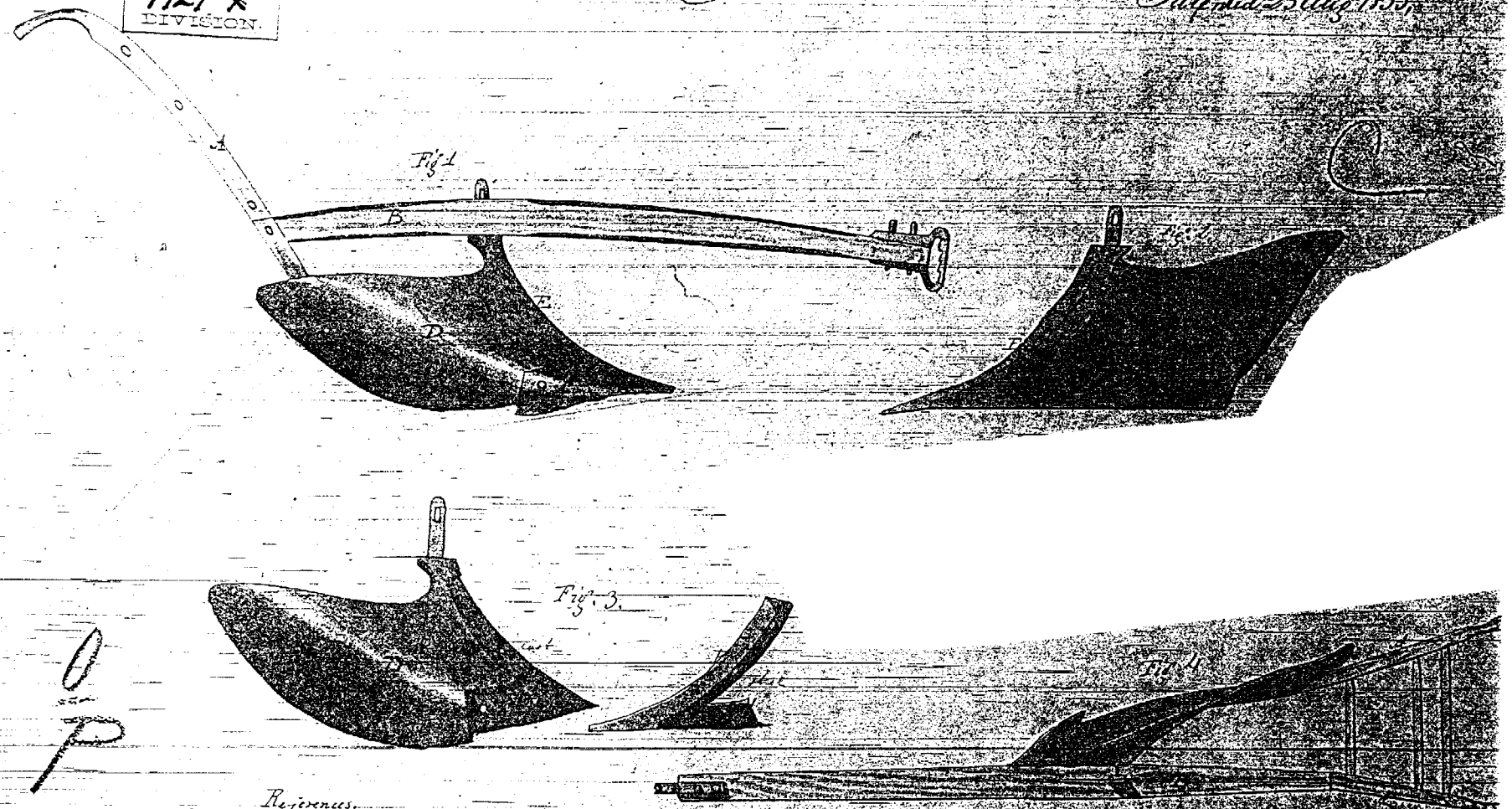
References.
Fig. 1. Side view of plough.
Fig. 2. Land side. Fig. 3. Mould board, share detached, cut
Fig. 4 Top view. A handles. B beam. C share.
D. mould board. E. coulter. F. land side.
Patent Office Model
Made under the direction of the Commissioner of Patents
in conformity with Act of Congress 3 March 1837.

7727X Aug 23 1839 471.

Charles B. Taylor — Bainbridge Ohio

Letters Patent

The Schedule referred to in these Letters Patent and making part
of the same containing a description in the words of the said Charles
B. Taylor himself of his improvement in the Plough.

To all to whom these presents shall come Be it known that I Charles
B. Taylor of Bainbridge in the County of Ross and State of Ohio have in-
-vented a new and useful improvement in the Plough and that the
following is a full and exact description of the construction and oper-
-ation of the said machine as invented or improved by me Viz. A
mould nineteen inches at the top and seventeen inches at the bottom
of cast iron being thirteen inches high. The landside eighteen inches
long of cast iron it and the mould board being cast solid or in one
piece — the top of the mould has a small [illegible] two inches wide and
one inch thick to pass thro the beam. A share thirteen inches long and
two inches wide cast solid with the mould board — a coulter of steel
twelve inches long and six inches wide two inches on the land side
and three on the mould board fastened by two screw bolts passing thro
the coulter and mould board a second share of steel fifteen inches
long and seven inches wide fitting up to a shoulder or rabbet in
the mould board and running an inch and half under the first
share and made fast by two screw bolts. The coulter and second
share being [illegible] at the point a plate of steel put on the out
side of the land side fastened by two screw bolts A wooden beam
four feet long and two handles three feet long handles fastened
together by three rungs.

What I claim as my invention or improve-
-ment in the above is the cast iron share or first share cast solid
with the mould board the land side cast solid or in one piece
the steel plate on the land side the second share being of steel

[illegible]

472.

[illegible]

and split and made so as to fit on a Shoulder on the mould board
and Cover the Second Share on top and project an inch and a half on
the under side being welded fast to the Culter at the point fastened by
two Screw bolts to the mould board the coulter of Steel or iron split and
made extending three inches on the mould board two + a half on the
land side fastened by two screw bolts the mould board being of the form
of the Cary or Bull Plough Witnesses                                        Charles B Taylor Ent.   James W King }
M.G.C.   Stephen Foulk }

[468 wds]